US011968686B2

United States Patent
Zeng et al.

(10) Patent No.: US 11,968,686 B2
(45) Date of Patent: Apr. 23, 2024

(54) ENHANCED USER EQUIPMENT CHANNEL STATE FEEDBACK CAPABILITY WITH FREQUENT REPORTING

(71) Applicant: QUALCOMM Incorporated, San Diego, CA (US)

(72) Inventors: Weiliang Zeng, San Diego, CA (US); Sanaz Barghi, Carlsbad, CA (US); Pouriya Sadeghi, San Diego, CA (US); Navin Dunichand Anwani, Gondia (IN); Supratik Bhattacharjee, San Diego, CA (US); Gautham Hariharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/535,201

(22) Filed: Nov. 24, 2021

(65) Prior Publication Data
US 2023/0164791 A1    May 25, 2023

(51) Int. Cl.
*H04W 72/23*    (2023.01)
*H04W 24/02*    (2009.01)
*H04W 72/04*    (2023.01)
*H04W 72/0446*    (2023.01)

(52) U.S. Cl.
CPC .......... *H04W 72/23* (2023.01); *H04W 24/02* (2013.01); *H04W 72/0446* (2013.01)

(58) Field of Classification Search
CPC ............... H04W 72/042; H04W 24/02; H04W 72/0446
See application file for complete search history.

(56) References Cited

U.S. PATENT DOCUMENTS

| | | | |
|---|---|---|---|
| 2017/0094545 A1* | 3/2017 | Subrahmanya | H04L 1/0027 |
| 2018/0139758 A1* | 5/2018 | Sankar | H04W 72/0466 |
| 2019/0223033 A1* | 7/2019 | Nam | H04B 7/0805 |
| 2019/0239135 A1* | 8/2019 | Levitsky | H04L 5/0057 |
| 2020/0403656 A1* | 12/2020 | Cheraghi | H04B 7/0452 |
| 2021/0266763 A1* | 8/2021 | Yoo | H04L 1/0026 |
| 2021/0336666 A1* | 10/2021 | Gutman | H04L 5/0051 |
| 2021/0345399 A1* | 11/2021 | Levy | H04W 24/10 |
| 2022/0311555 A1* | 9/2022 | He | H04L 1/1812 |
| 2022/0360306 A1* | 11/2022 | Sun | H04L 5/0053 |
| 2023/0088766 A1* | 3/2023 | Qin | H04L 5/0057 |

* cited by examiner

*Primary Examiner* — Ronald B Abelson
(74) *Attorney, Agent, or Firm* — QUALCOMM Incorporated (57) ABSTRACT

A method of wireless communications by a user equipment (UE) includes decoding information received from a base station via a physical downlink shared channel (PDSCH). The UE determines whether to update channel state feedback based on the decoded information. The channel state feedback is updated based on the determination to generate updated channel state feedback. The updated channel state feedback is transmitted to the base station. The UE is configured to update the channel state feedback without an additional measurement of a channel state information reference signal (CSI-RS).

25 Claims, 6 Drawing Sheets

ENHANCED USER EQUIPMENT CHANNEL STATE FEEDBACK CAPABILITY WITH FREQUENT REPORTING

FIELD OF THE DISCLOSURE

The present disclosure relates generally to wireless communications, and more specifically to an enhanced user equipment channel state feedback capability with frequent reporting.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

In wireless communication standards, such as LTE/NR, channel state information (CSI) provides essential knowledge for adaptation of the varying channel. For example, for downlink (DL) communications, a channel state information reference signal (CSI-RS) may be used as a DL channel sounding RS. Based on an observation of the CSI-RS, a user equipment (UE) may estimate and report quantized channel state information (CSI) with which a base station (e.g., gNode B (gNB)) may adjust a transmission to the UE for improved channel adaptation. Similarly, a sounding reference signal (SRS) may be used as an uplink (UL) channel sounding reference signal. Based on channel reciprocity, a base station may adjust the transmission for improved channel adaptation.

However, accurate CSI reporting may be difficult to achieve, for various reasons. For instance, accurate CSI reporting may be difficult to achieve because of complexity constraints (e.g., timing constraints) or because there are no clear conventional methods to accurately map reference signal (RS) observations to receiver (e.g., UE) demodulation and decoding performance. In addition, accurate CSI reporting may be difficult to achieve because performance may vary under certain scenarios, such as where there are different channel profiles, correlations, signal-to-noise ratios (SNRs), ranks, precoding matrix indicators (PMIs), Doppler conditions, or the like. There may also be an interference discrepancy bandwidth observed in CSI-RS and data slots (e.g., in a dynamic spectrum sharing (DSS) deployment). As such, channel state feedback (CSF) accuracy may be insufficient.

SUMMARY

The present disclosure is set forth in the independent claims, respectively. Some aspects of the disclosure are described in the dependent claims.

In aspects of the present disclosure, a method of wireless communications by a user equipment (UE) is provided. The method includes decoding information received from a base station via a physical downlink shared channel (PDSCH). The method also includes determining whether to update channel state feedback (CSF) based on the decoded information. Additionally, the method includes updating and generating updated CSF based on the determining. Further, the method includes transmitting the updated CSF to the base station.

In other aspects of the present disclosure, an apparatus for wireless communications by a user equipment (UE) is provided. The apparatus includes a memory and one or more processors coupled to the memory. The processor(s) are configured to decode information received from a base station via a physical downlink shared channel (PDSCH). The processor(s) are also configured to determine whether to update channel state feedback (CSF) based on the decoded information. In addition, the processor(s) are configured to update and generate updated CSF based on the determining. Further, the processor(s) are configured to transmit the updated CSF to the base station.

In yet other aspects of the present disclosure, a method for wireless communications by a base station is provided. The method includes transmitting, to a user equipment (UE), encoded information. The method also includes receiving, from the UE, updated channel state feedback (CSF), which is determined based on decoding of the encoded information. Further, the method includes transmitting, to the UE, additional encoded information based on the updated CSF.

In still other aspects of the present disclosure, an apparatus for wireless communications by a base station is provided. The apparatus includes a memory and one or more processors coupled to the memory. The processor(s) are configured to transmit, to a user equipment (UE), encoded information. The processor(s) are also configured to receive, from the UE, updated channel state feedback (CSF), which is determined based on decoding of the encoded information. Furthermore, the processor(s) are configured to transmit, to the UE, additional encoded information based on the updated CSF.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As described, channel state feedback (CSF) accuracy may be insufficient for various reasons. This may be particularly so when there is a difference in the interference in the channel that CSI-RS observes compared to that which is observed in downlink (DL) data (e.g., in a dynamic spectrum sharing (DSS) scenario where LTE unloaded cell interference is only observed on DL data and not seen on CSI-RS resources). In addition, offline channel state feedback alignment may be impractical to address dynamic channel conditions when the demodulation performance varies.

Combining a RS with information from a data channel may be beneficial for a UE to provide accurate reporting that reflects demodulation and decoding performance. Outer loop driving (e.g., via acknowledgement/negative acknowledgement (ACK/NACK)) has been employed with some well-known disadvantages, including that it does not handle burst traffic well. The ACK/NACK feedback may also be mismatched with actual receiver performance. For example, in unlicensed new radio bands/ultra-reliable low latency communications (NR-U/URLLC), the medium access loss for sub-bands or symbols may generates NACKs, but the reported CSI may not be overestimated. Additionally, the convergence time for outer loop driving may be excessive, and also it does not necessarily provide the best throughput due to a pre-defined block error rate (BLER) target at a base station (e.g., 10%).

Accordingly, aspects of the present disclosure provide solutions to enable accurate reporting with respect to UE demodulation and decoding performance. According to aspects of the present disclosure, information from granted data (e.g., use of decoder soft metrics) may be used to adjust CSI that is derived from an RS observation. RS/measurement-based and RS/measurement-free frequent reporting may facilitate channel information retrieval at a base station to enhance the UE CSF capability. Aspects of the present disclosure may advantageously provide a low complexity approach for ease of implementation with good generalization to different channels and unseen environments. Additionally, aspects of present disclosure may advantageously provide improved throughput, and fast convergence due to the high prediction accuracy. Moreover, the enhanced UE CSF capability may account for interference that is experienced in a UE data channel and may not be seen in an RS observation (e.g., in a DSS deployment).

Figure 1:
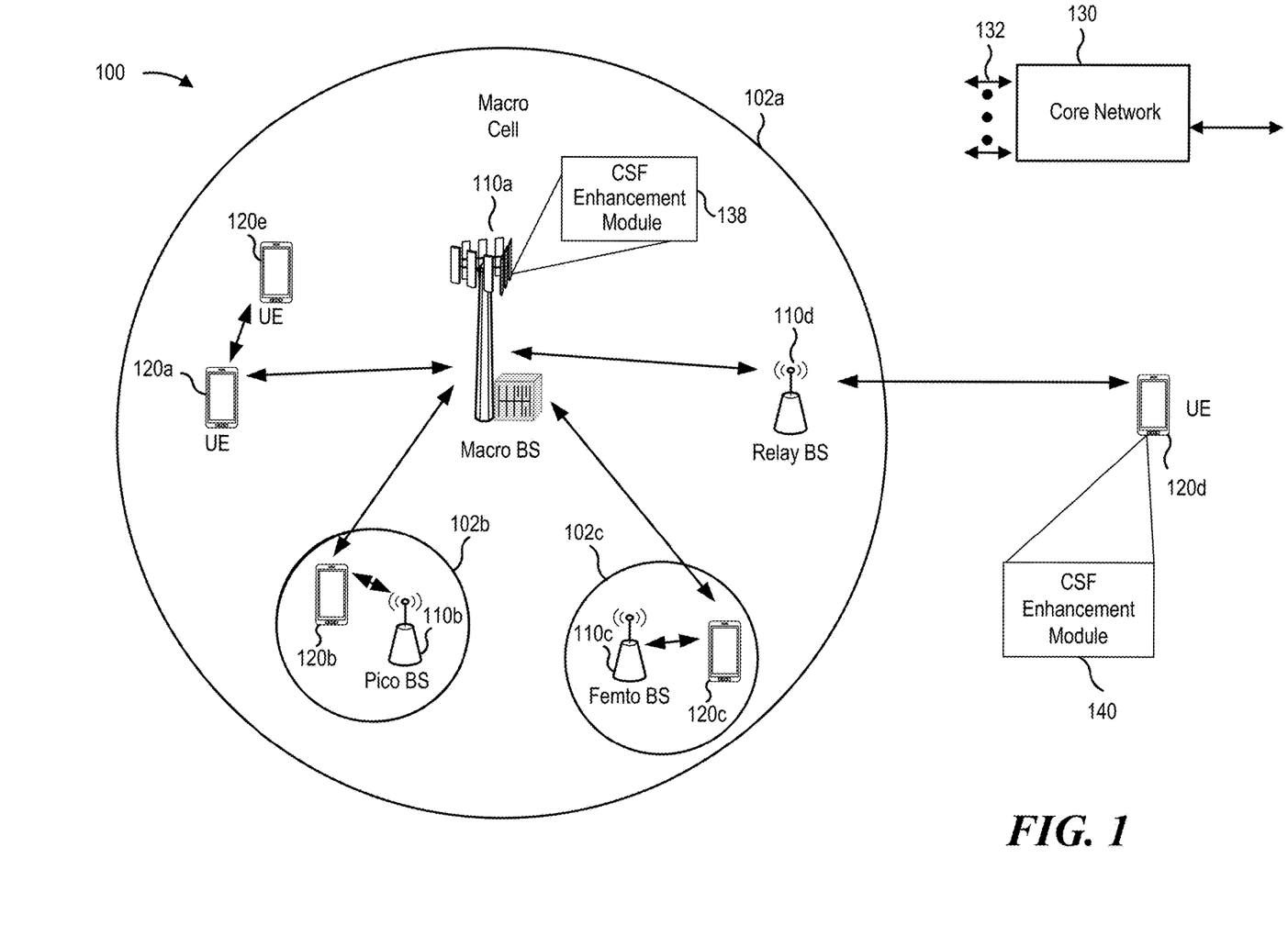
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a channel state feedback (CSF) enhancement module 140. For brevity, only one UE 120*d* is shown as including the CSF enhancement module 140. The CSF enhancement module 140 may determine an update for channel state feedback based on decoder information in a PDSCH time slot window. The CSF enhancement module 140 may decode information received from a base station via a physical downlink shared channel (PDSCH). The CSF enhancement module 140 may also determine whether to update channel state feedback (CSF) based on the decoded information. Additionally, the CSF enhancement module 140 may update the CSF based on the determining to generate updated CSF. The CSF enhancement module 140 may further transmit the updated CSF to the base station.

The core network 130 or the base stations 110 may include a channel state feedback (CSF) enhancement module 138 for updating encoded data transmissions based on updated CSF. The channel state feedback (CSF) enhancement module 138 may transmit, to a user equipment (UE), encoded information. The channel state feedback (CSF) enhancement module 138 may also receive, from the UE, updated channel state feedback (CSF), which is determined based on decoding of the encoded information. Furthermore, the channel state feedback (CSF) enhancement module 138 may transmit, to the UE, additional encoded information based on the updated CSF.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
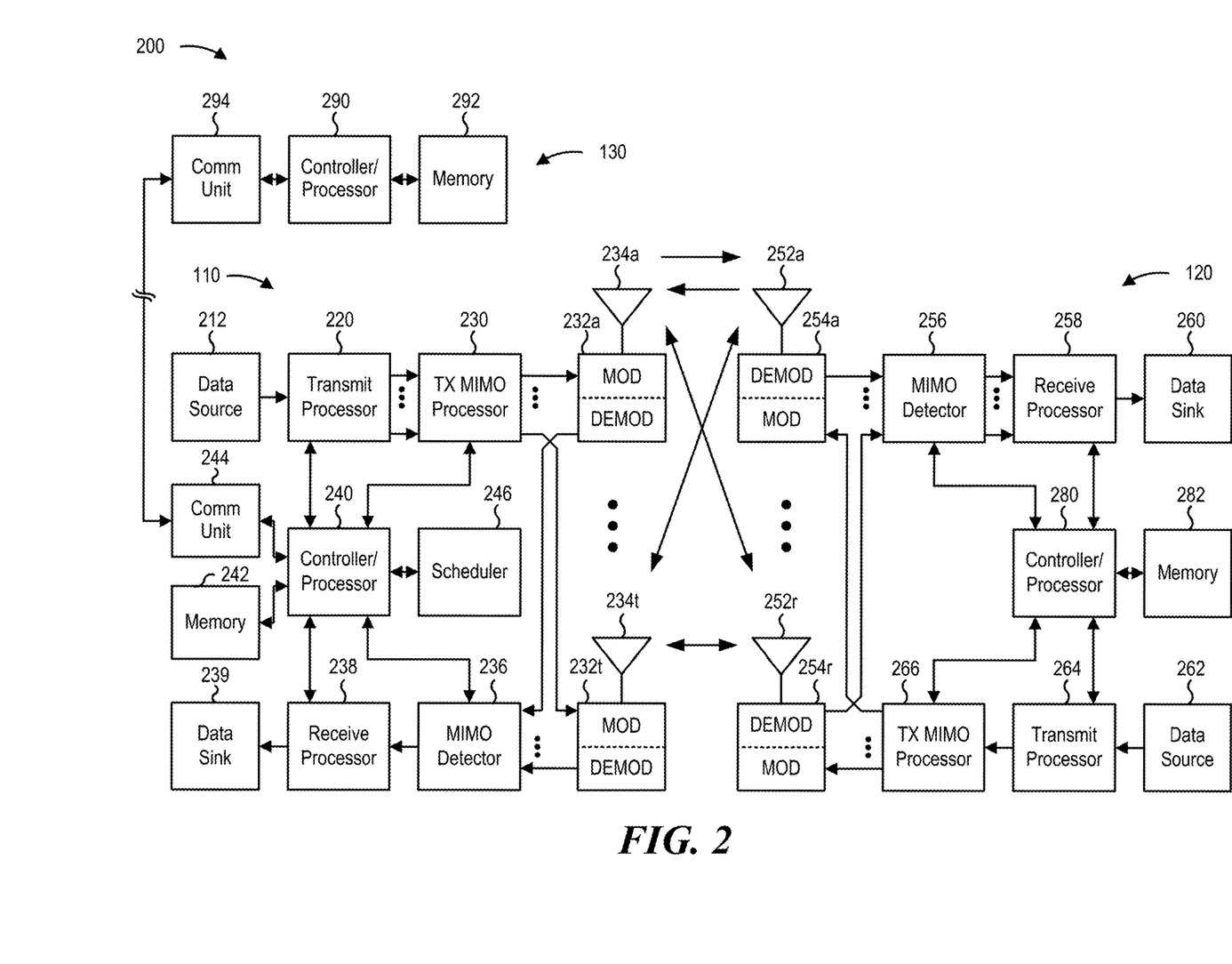
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with adjusting or updating channel state feedback, as described in more detail elsewhere. For example, the controller/processor 240 of the base station 110, the controller/processor 280 of the UE 120, and/or any other component(s) of FIG. 2 may perform or direct operations of, for example, the processes of FIGS. 5 and 6 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or base station 110 may include means for receiving, means for decoding, means for determining whether to update, means for updating and generating, means for transmitting the updated channel state feedback, means for transmitting encoded information, means for receiving updated channel state feedback and/or means for transmitting additional encoded information. Such means may include one or more components of the UE 120 or base station 110 described in connection with FIG. 2.

As indicated above, FIG. 2 is provided merely as an example. Other examples may differ from what is described with regard to FIG. 2.

Aspects of the present disclosure are directed to an enhanced UE channel state feedback (CSF) capability with increased frequency of reporting. As described, certain channel state information reference signal (CSI-RS) measurements may be used to provide additional information to frequently update or adjust CSF.

A CSI-RS is a signal that a UE may use to measure varied radio channel quality and report the results to a base station (e.g., gNB). CSI-RS is configured on a per device (e.g., UE) basis and may correspond to different antenna ports that correspond to a channel to be sounded. CSI-RS may be used to derive information about the properties of the channel on which it is transmitted. In addition, CSI-RS may be used to estimate the interference observed in the channel. The interference may, for instance, be estimated by subtracting the expected received signal from the signal actually received via the CSI-RS resource.

The CSI-RS may be used to generate a report for the base station. The report may, for example, include a channel quality indicator (CQI), a rank indicator (RI), and/or a precoding matrix indicator (PMI). In some aspects, a report may be provided to the base station (e.g., gNB), even in the absence of new CSI-RS measurements.

In accordance with aspects of the present disclosure, channel state feedback may be updated or adjusted based on one or more observed physical downlink shared channel (PDSCH) data slots. Frequent reporting may provide the base station an opportunity to adjust a transmission such as PMI, RI, and CQI, for example, between CSI-RS measurements. This may be especially beneficial when the CSI-RS periodicity is low (e.g., when the time between observation is greater).

Figure 3:
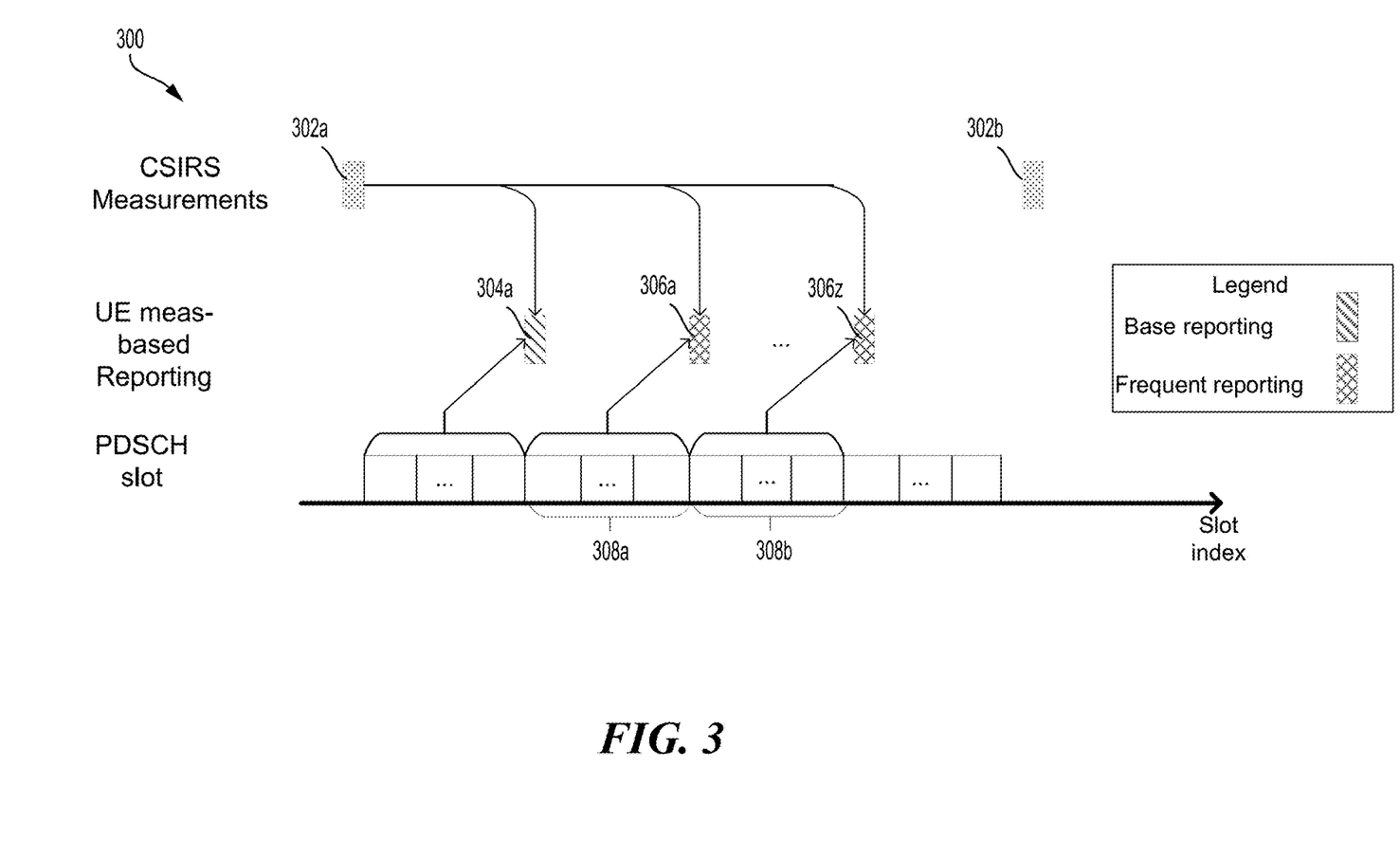
FIG. 3 is a diagram illustrating an example of user equipment (UE) enhanced channel state feedback, in accordance with aspects of the present disclosure.

FIG. 3 is a diagram illustrating an example 300 of UE enhanced channel state feedback, in accordance with aspects of the present disclosure. Referring to FIG. 3, a channel state information reference signal (CSI-RS) 302a may be transmitted via a base station (e.g., the base station 110 shown in FIG. 1). The CSI-RS 302a may be transmitted on a periodic, semi-persistent, or aperiodic basis. A UE (e.g., the UE 120 shown in FIG. 1) may observe the CSI-RS 302a and may derive channel state information, which may be supplied to the base station as channel state feedback based on the observation. The UE may generate a CSI-RS measurement report 304a to provide the derived channel state information to the base station as channel state feedback. The transmission of the CSI-RS measurement report 304a may be considered base reporting. The base reporting may be provided on a periodic, semi-persistent or aperiodic basis. Typically, the base reporting may be provided in a same manner or frequency as the CSI-RS is provided.

The UE may receive downlink data transmission from the base station via the PDSCH. For a given PDSCH time slot window 308a, 308b, the UE may collect PDSCH decoder information. The PDSCH decoder information may indicate the quality of received information, for example. The UE may then determine whether to update or adjust the channel state feedback (e.g., provided via the CSI-RS measurement report 304a). In some aspects, the UE may determine whether to update or adjust the channel state feedback based on a comparison of channel state information derived from measurements of the CSI-RS and channel state information derived via observation during the PDSCH time slot window 308a.

In some aspects, the UE may determine whether to update or adjust the channel state feedback via machine learning. For instance, the UE may determine whether to update or adjust the channel state feedback by predicting if a different modulation and coding scheme (MCS) could have passed a cyclic redundancy check (CRC) based on the PDSCH decoder information.

The UE may generate a measurement report 306a including information to update or adjust the channel state feedback. The UE may transmit the measurement report 306a to the base station. In some aspects, the UE may provide one updated channel state feedback per PDSCH time slot window (e.g., 308a, 308b). The measurement report 306a based on the channel state information derived via the observed PDSCH time slot window (e.g., 308a, 308b) may be considered frequent reporting. The frequent reporting is provided between CSI-RSs (e.g., between 302a and 302b). A UE that is capable of deriving channel state information from PDSCH time slot windows 308a and 308b, and reporting such information to the base station may be considered to have an enhanced channel state feedback capability. That is, enhanced or higher channel state feedback capability may mean improved reporting accuracy, that a transmitter (e.g., base station 110) may consider when making transmission adaptation decisions. For example, the outer loop link adaptation (OLLA) algorithm adaptively modifies the mapping from CQI to MCS based on ACK/NACK. A receiver (e.g., UE 120) may have the capability to report an ideal CSI that increases, and in some aspects may maximize, the overall throughput, but only if the transmitter (e.g., base station 110) follows exactly as in the reporting. However, OLLA modifies or readjusts the reporting to achieve a specified target (e.g., block error rate (BLER)), which may contradict a throughput maximum. Accordingly, to address this mismatch, the enhanced or higher channel state feedback capability may be considered when determining whether to turn OLLA ON or OFF, or adjusting OLLA step size in the case of mismatched assumptions.

In some aspects, the UE may transmit a report (e.g., base reporting) indicating enhanced channel state feedback capability. In turn, the base station may apply a bias favoring the updated channel state feedback determined based on decoder information (e.g., via the PDSCH time slot window 308a, 308b) rather than solely based on measurement of the CSI-RSs 302a, 302b. This is because the channel conditions between a CSI-RS and PDSCH may be different. For instance, interference observed in the PDSCH may not be observed in the CSI-RS. As such, channel state feedback based solely on the CSI-RS may result in a greater BLER and lower signal-to-interference-plus-noise (SINR) than expected (e.g., based on CSI-RS) and thus, poor performance. Accordingly, a base station may be motivated to apply more weight to the UE's reporting by directly following the UE's reporting (e.g., frequent reporting based on the PDSCH time slot windows 308a, 308b) for better performance.

In some aspects, the frequent measurement reporting (e.g., from measurement reports 306a, 306z) may include the actual values of the channel state information derived via the observed PDSCH time slot window 308a, 308b. Alternatively or additionally, the frequent measurement reporting may include a quantized report. For instance, the difference (or delta) between the previous channel state feedback (e.g., based on the CSI-RS or a previous report based on the PDSCH time slot window) may be included in the frequent measurement reporting. Furthermore, in some aspects, the frequent reporting may have a different reporting configuration or may reuse a configuration from previous reporting (e.g., base reporting).

The frequent reporting may be conducted on a periodic, semi-persistent, or aperiodic basis. In some aspects, the frequent reporting may have its own reporting slot offset and reporting frequency, which may be defined in the reporting configuration. Moreover, the frequent reporting may be tied to one particular CSI process, based on which the base station can process the CSF, accordingly.

In turn, the base station may adjust subsequent downlink transmission to the UE based on the updated channel state feedback.

Figure 4:
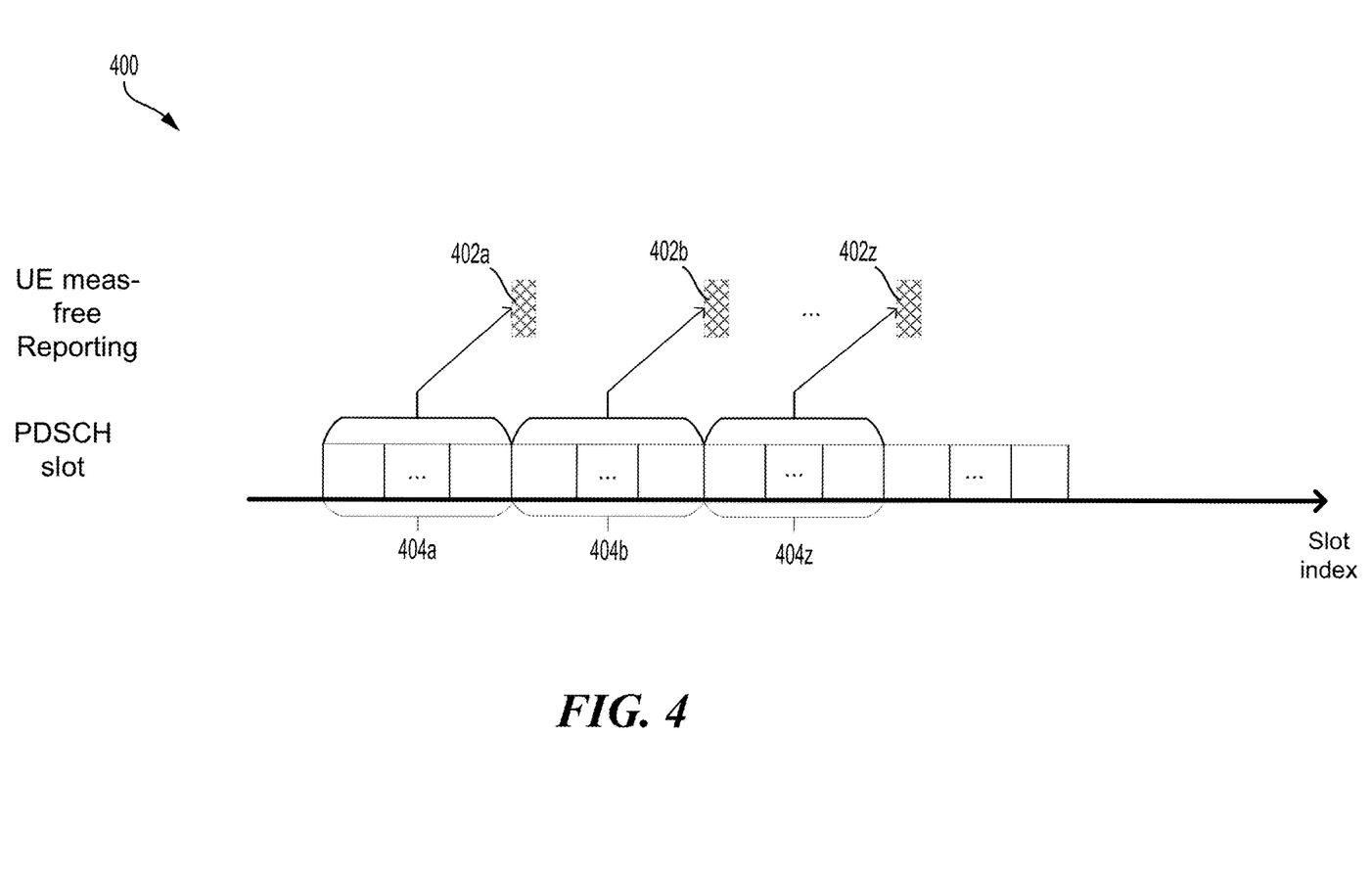
FIG. 4 is a diagram illustrating an example of user equipment (UE) enhanced channel state feedback in the absence of a channel state information reference signal (CSI-RS) measurement report, in accordance with aspects of the present disclosure.

FIG. 4 is a diagram illustrating an example 400 of UE enhanced channel state feedback (CSF) in the absence of a channel state information reference signal (CSI-RS) measurement report, in accordance with aspects of the present disclosure. Referring to FIG. 4, the UE may report CSF without observing any CSI-RS or CSI interference measurement (CSI-IM) signals. That is, in the absence of the CSI-RS or CSI-IM signals, the UE may derive channel state information and report such information to the base station via frequent reports 402a-402z solely based on observed downlink (DL) data slots (e.g., PDSCH time slot windows 404a-404z). Measurement-free frequent reporting may aid the base station (e.g., base station 110 shown in FIG. 1) to track both the channel and demodulation/decoding performance of the UE (e.g., UE 120 shown in FIG. 1).

For a set of DL data slots (e.g., PDSCH time slot windows 404a-404z), the UE may collect decoder information of a data channel. The UE may predict if a different MCS/rank/PMI may provide improved performance (e.g., greater achievable spectrum efficiency). In some examples, the UE may predict if a different MCS could have passed the CRC. In some aspects, the UE may calculate a channel state feedback adjustment based on the prediction. The channel state feedback adjustment may be reported to the base station via the frequent reporting.

In some aspects, the UE may report the collected decoder information directly to gNB. That is, rather than deriving channel state information based on the decoder information, the UE transmits the collected decoder information to the base station. The base station may receive the collected decoder information and determine whether to update or adjust the channel state feedback based directly on the received decoder information. For example, in some aspects, the UE may report only statistics of the decoder information to the base station, which may beneficially reduce the feedback overhead.

As described with reference to FIG. 3, the frequent reporting may have a different reporting configuration or may reuse some configuration from previous reporting (e.g., similar to base reporting). The frequent reporting (e.g., 402a-402z) may be conducted on a periodic, semi-persistent, or aperiodic basis. In some aspects, the frequent reporting may have its own reporting slot offset and reporting frequency, which may be defined in the reporting configuration.

As indicated above, FIGS. 3 and 4 are provided as examples. Other examples may differ from what is described with respect to FIGS. 3 and 4.

Figure 5:
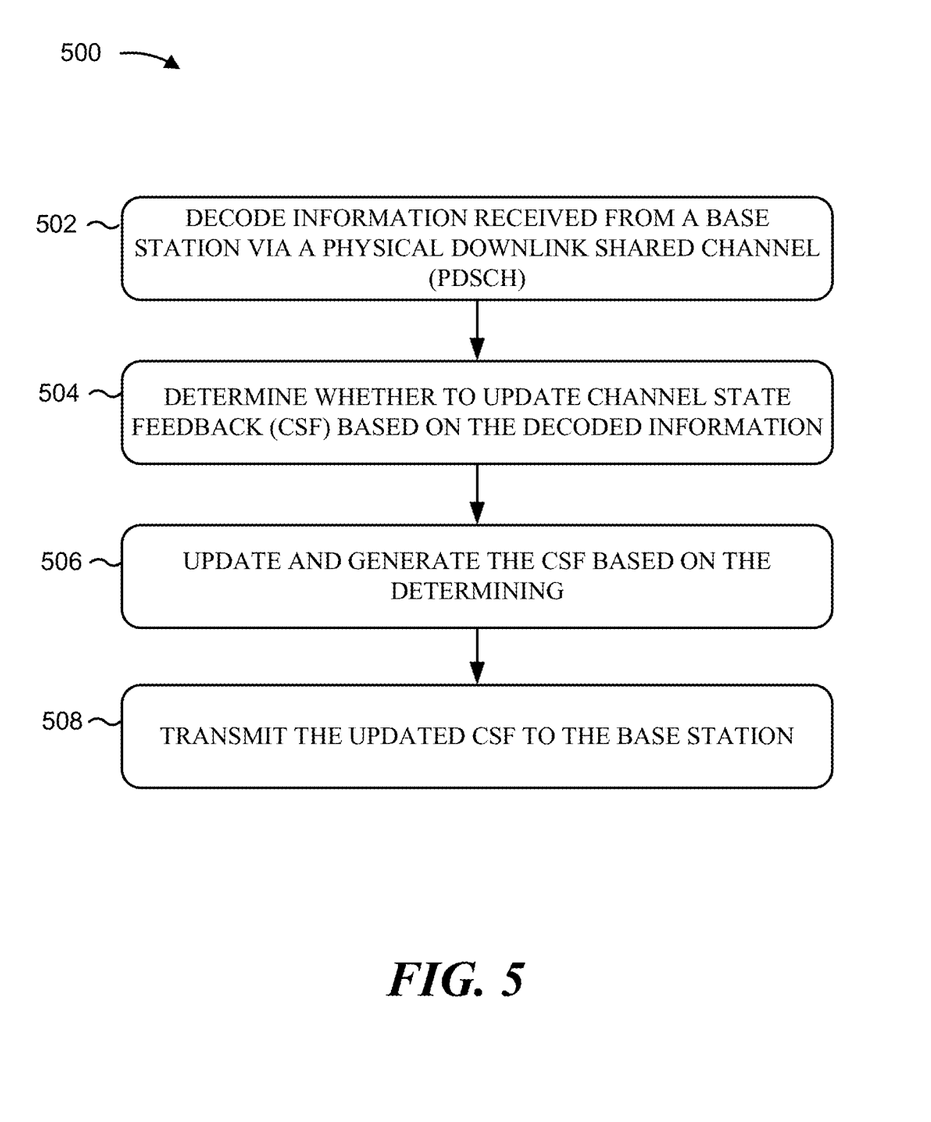
FIG. 5 is a flow diagram illustrating an example process performed, for example, by a user equipment (UE), in accordance with various aspects of the present disclosure.

FIG. 5 is a flow diagram illustrating an example process 500 performed, for example, by a user equipment (UE), in accordance with various aspects of the present disclosure. The example process 500 is an example of wireless communication by a UE. At block 502, the UE decodes information received from a base station via a physical downlink shared channel (PDSCH), for example, with the antenna 252, demodulator 254, MIMO detector 256, receive processor 258, controller/processor 280 and/or memory 282 as shown in FIG. 2. As described with reference to FIG. 3, a UE may receive downlink data transmission from the base station via the PDSCH. For a given PDSCH time slot window 308a, 308b, the UE may collect PDSCH decoder information. The PDSCH decoder information may indicate the quality of received information (e.g., may include CQI, RI, and PMI), for example.

At block 504, the UE determines whether to update channel state feedback (CSF) based on the decoded information, for example, with the controller/processor 280 and/or memory 282 as shown in FIG. 2. In some aspects, the UE may determine whether to update or adjust the channel state feedback based on a comparison of channel state information derived from measurements of the CSI-RS and channel state information derived via observation during the PDSCH time slot window 308a. In some aspects, the UE may determine whether to update or adjust the channel state feedback via machine learning. For example, the UE may determine whether to update or adjust the channel state feedback by predicting whether a different modulation and coding scheme (MCS) could have passed a cyclic redundancy check (CRC) based on the PDSCH decoder information.

At block 506, the UE updates and generates updated CSF based on the determining, for example, with the controller/processor 280 and/or memory 282 as shown in FIG. 2. As described with reference to FIG. 3, the UE may generate a measurement report 306a including information to update or adjust the channel state feedback. In some aspects, the UE may provide one updated channel state feedback per PDSCH time slot window (e.g., 308a, 308b). The measurement report 306a based on the channel state information derived via the observed PDSCH time slot window (e.g., 308a, 308b) may be considered frequent reporting. The frequent reporting is provided between CSI-RSs (e.g., between 302a and 302b). A UE that is capable of deriving channel state information from PDSCH time slot windows 308a and 308b, and reporting such information to the base station may be considered to have an enhanced channel state feedback capability. That is, enhanced or higher channel state feedback capability may mean improved reporting accuracy, that a transmitter (e.g., base station 110) may consider when making transmission adaptation decisions. For example, the outer loop link adaptation (OLLA) algorithm adaptively modifies the mapping from CQI to MCS based on ACK/NACK.

At block 508, the UE transmits the updated CSF to the base station, for example, with the antenna 252, modulator 254, Tx MIMO processor 266, transmit processor 264, controller/processor 280 and/or memory 282 as shown in FIG. 2. For example, as described with reference to FIG. 3, the UE may transmit the measurement report 306a to the base station.

Figure 6:
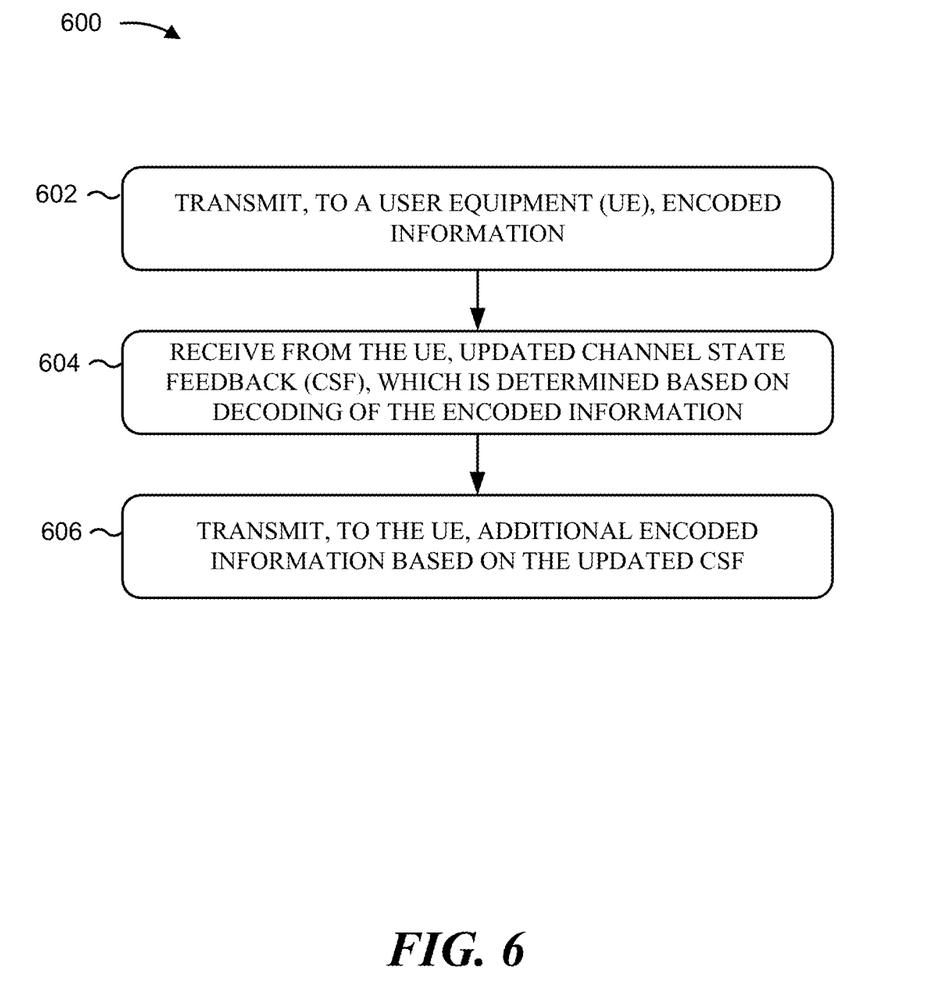
FIG. 6 is a flow diagram illustrating an example process performed, for example, by a base station, in accordance with various aspects of the present disclosure.

FIG. 6 is a flow diagram illustrating an example process 600 performed, for example, by a base station, in accordance with various aspects of the present disclosure. The example process 600 is an example of wireless communication by a base station. At block 602, the base station transmits, to a user equipment (UE), encoded information, for example, with the antenna 234, modulator 232, Tx MIMO processor 230, transmit processor 220, controller/processor 240 and/or memory 242 as shown in FIG. 2. For example, as described with reference to FIG. 3, a channel state information reference signal (CSI-RS) 302a may be transmitted via a base station (e.g., the base station 110 shown in FIG. 1). The CSI-RS 302a may be transmitted on a periodic, semi-persistent, or aperiodic basis.

At block 604, the base station receives, from the UE, updated channel state feedback (CSF), which is determined based on decoding of the encoded information, for example, with the antenna 234, demodulator 232, MIMO detector 236, receive processor 238, controller/processor 240 and/or memory 242 as shown in FIG. 2. The UE may transmit the measurement report 306a to the base station. In some aspects, the UE may provide one updated channel state feedback per PDSCH time slot window (e.g., 308a, 308b). The measurement report 306a based on the channel state information derived via the observed PDSCH time slot window (e.g., 308a, 308b) may be considered frequent reporting. The frequent reporting is provided between CSI-RSs (e.g., between 302a and 302b).

At block 606, the base station transmits, to the UE, additional encoded information based on the updated CSF, for example, with the antenna 234, modulator 232, Tx MIMO processor 230, transmit processor 220, controller/processor 240 and/or memory 242 as shown in FIG. 2. For instance, as described with reference to FIG. 3, the base station may adjust subsequent downlink transmission to the UE based on the updated channel state feedback.

Implementation examples are provided in the following numbered clauses:

1. A method of wireless communications by a user equipment (UE), comprising:
   decoding information received from a base station via a physical downlink shared channel (PDSCH);
   determining whether to update channel state feedback (CSF) based on the decoded information;
   updating and generating updated CSF based on the determining; and
   transmitting the updated CSF to the base station.
2. The method of clause 1, in which the updating is conducted absent an additional measurement of a channel state information reference signal (CSI-RS).
3. The method of clause 1 or 2, in which the transmitting occurs in a semi-persistent, aperiodic, or periodic manner.
4. The method of any of clauses 1-3, in which the updating comprises a difference relative to a prior CSF transmission.
5. The method of any of clauses 1-4, in which the determining comprises predicting a channel quality based on decoder information.
6. The method of any of clauses 1-5, further comprising measuring a channel state information reference signal (CSI-RS) to generate the channel state feedback.
7. The method of any of clauses 1-6, in which the information is received via the PDSCH during a time slot window.
8. The method of any of clauses 1-7, further comprising:
   collecting decoder information during decoding of the PDSCH; and
   reporting the collected decoder information or associated statistics to the base station.
9. The method of any of clauses 1-8, further comprising modifying a link adaptation procedure from the base station based on the updated CSF.
10. The method of any of clauses 1-9, further comprising reporting an enhanced CSF capability.
11. The method of any of clauses 1-10, further comprising reporting a channel quality index (CQI) that accounts for each modulation coding scheme (MCS).

12. The method of any of clauses 1-11, further comprising transmitting the updated CSF in accordance with an updated reporting configuration.

13. The method of any of clauses 1-12, in which the updated CSF corresponds to a specific channel state information (CSI) process.

14. A method of wireless communications by a base station, comprising:
- transmitting, to a user equipment (UE), encoded information;
- receiving, from the UE, updated channel state feedback (CSF), which is determined based on decoding of the encoded information; and
- transmitting, to the UE, additional encoded information based on the updated CSF.

15. The method of clause 14, in which the updated CSF is received absent an additional measurement of a channel state information reference signal (CSI-RS).

16. The method of clause 14 or 15, in which the receiving occurs in a semi-persistent, aperiodic, or periodic manner.

17. The method of any of clauses 14-16, in which the updated CSF comprises a difference relative to a prior CSF.

18. The method of any of clauses 14-17, in which the updated CSF is based on a prediction of whether channel quality improves or degrades based on decoder information.

19. The method of any of clauses 14-18, further comprising transmitting a channel state information reference signal (CSI-RS) to the UE, the updated CSF being determined based on the CSI-RS.

20. The method of any of clauses 14-19, in which the encoded information is transmitted via a physical downlink shared channel (PDSCH) for a time slot window.

21. The method of any of clauses 14-20, further comprising receiving, from the UE, a report of decoder information collected during the decoding of the encoded information.

22. The method of any of clauses 14-21, further comprising modifying an outer loop link adaptation procedure based on the updated CSF.

23. The method of any of clauses 14-22, further comprising receiving, from the UE, a report including a channel quality index (CQI) that accounts for each modulation coding scheme (MCS).

24. The method of any of clauses 14-23, further comprising receiving the updated CSF in accordance with an updated reporting configuration.

25. The method of any of clauses 14-24, in which the updated CSF corresponds to a specific channel state information (CSI) process.

26. The method of any of clauses 14-25, further comprising receiving from the UE a report indicating an enhanced CSF capability.

27. The method of any of clauses 14-26, further comprising applying a bias in response to receiving the report indicating the enhanced CSF capability, the bias favoring the updated CSF, which is based on decoder information, rather than baseline CSF only based on measurement of a channel state information reference signal (CSI-RS).

28. An apparatus of wireless communication by a user equipment, comprising:
- a memory; and
- at least one processor coupled to the memory, the at least one processor being configured:
  - to decode information received from a base station via a physical downlink shared channel (PDSCH);
  - to determine whether to update channel state feedback (CSF) based on the decoded information;
  - to update and generate updated CSF based on the determination of whether to update the CSF; and
  - to transmit the updated CSF to the base station.

29. An apparatus of wireless communication by a user equipment, comprising:
- a memory; and
- at least one processor coupled to the memory, the at least one processor being configured:
  - to transmit, to a user equipment (UE), encoded information;
  - to receive, from the UE, updated channel state feedback (CSF), which is determined based on decoding of the encoded information; and
  - to transmit, to the UE, additional encoded information based on the updated CSF.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used.

Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a user equipment (UE), comprising:
    decoding information received from a base station via a physical downlink shared channel (PDSCH) during a time slot window;
    determining, by the UE, whether to update channel state feedback (CSF) based on one of machine learning using the decoded information or a comparison of channel state information (CSI) derived from a measurement of a CSI-reference signal (CSI-RS) and CSI derived via the PDSCH during the time slot window;
    generating, based on the determining, a measurement report to update the CSF using channel state information (CSI) derived via the PDSCH during the time slot window; and
    transmitting the updated CSF to the base station.

2. The method of claim 1, in which the transmitting occurs in a semi-persistent, aperiodic, or periodic manner.

3. The method of claim 1, in which the update comprises a difference relative to a prior CSF transmission.

4. The method of claim 1, in which the determining comprises predicting a channel quality based on decoder information.

5. The method of claim 1, further comprising measuring the CSI-RS to generate the channel state feedback.

6. The method of claim 1, further comprising:
    collecting decoder information during decoding of the PDSCH; and
    reporting the collected decoder information or associated statistics to the base station.

7. The method of claim 1, further comprising modifying a link adaptation procedure from the base station based on the updated CSF.

8. The method of claim 1, further comprising reporting an enhanced CSF capability.

9. The method of claim 1, further comprising reporting a channel quality index (CQI) that accounts for each modulation coding scheme (MCS).

10. The method of claim 1, further comprising transmitting the updated CSF in accordance with an updated reporting configuration.

11. The method of claim 1, in which the updated CSF corresponds to a specific channel state information (CSI) process.

12. A method of wireless communications by a base station, comprising:
    transmitting, to a user equipment (UE), encoded information via a physical downlink shared channel (PDSCH) for a time slot window;
    receiving, from the UE, updated channel state feedback (CSF) generated using channel state information (CSI) derived via the PDSCH for the time slot window, the updated CSF being generated responsive to a determination based on one of machine learning using PDSCH decoder information or a comparison of channel state information (CSI) derived from a measurement of a CSI-reference signal (CSI-RS) and CSI derived via the PDSCH during the time slot window; and
    transmitting, to the UE, additional encoded information based on the updated CSF.

13. The method of claim 12, in which the receiving occurs in a semi-persistent, aperiodic, or periodic manner.

14. The method of claim 12, in which the updated CSF comprises a difference relative to a prior CSF.

15. The method of claim 12, in which the updated CSF is based on a prediction of whether channel quality improves or degrades based on decoder information.

16. The method of claim 12, further comprising transmitting the CSI-RS to the UE, the updated CSF being determined based on the CSI-RS.

17. The method of claim 12, further comprising receiving, from the UE, a report of the PDSCH decoder information collected during decoding of the encoded information.

18. The method of claim 12, further comprising modifying an outer loop link adaptation procedure based on the updated CSF.

19. The method of claim 12, further comprising receiving, from the UE, a report including a channel quality index (CQI) that accounts for each modulation coding scheme (MCS).

20. The method of claim 12, further comprising receiving the updated CSF in accordance with an updated reporting configuration.

21. The method of claim 12, in which the updated CSF corresponds to a specific channel state information (CSI) process.

22. The method of claim 12, further comprising receiving from the UE a report indicating an enhanced CSF capability.

23. The method of claim 22, further comprising applying a bias in response to receiving the report indicating the enhanced CSF capability, the bias favoring the updated CSF, which is based on decoder information, rather than baseline CSF only based on measurement of a channel state information reference signal (CSI-RS).

24. An apparatus of wireless communication by a user equipment, comprising:
    a memory; and
    at least one processor coupled to the memory, the at least one processor being configured:
    to decode information received from a base station via a physical downlink shared channel (PDSCH) during a time slot window;
    to determine whether to update channel state feedback (CSF) based on one of machine learning using the decoded information or a comparison of channel state information (CSI) derived from a measurement of a CSI-reference signal (CSI-RS) and CSI derived via the PDSCH during the time slot window;
    to update and generate, based on the determining, a measurement report to update the CSF using channel state information (CSI) derived via the PDSCH during the time slot window; and
    to transmit the updated CSF to the base station.

25. An apparatus of wireless communication by a base station, comprising:
    a memory; and
    at least one processor coupled to the memory, the at least one processor being configured:
    to transmit, to a user equipment (UE), encoded information via a physical downlink shared channel (PDSCH) for a time slot window;
    to receive, from the UE, updated channel state feedback (CSF) generated using channel state information (CSI) derived via the PDSCH for the time slot window, the updated CSF being generated responsive to a determination based on one of machine learning using PDSCH decoder information or a comparison of channel state information (CSI) derived from a measurement of a CSI-reference signal (CSI-RS) and CSI derived via the PDSCH during the time slot window; and to transmit, to the UE, additional encoded information based on the updated CSF.

* * * * *